INVENTORS
R. O. WELTY
E. C. MILLER
BY Hudson C. Young
ATTORNEYS

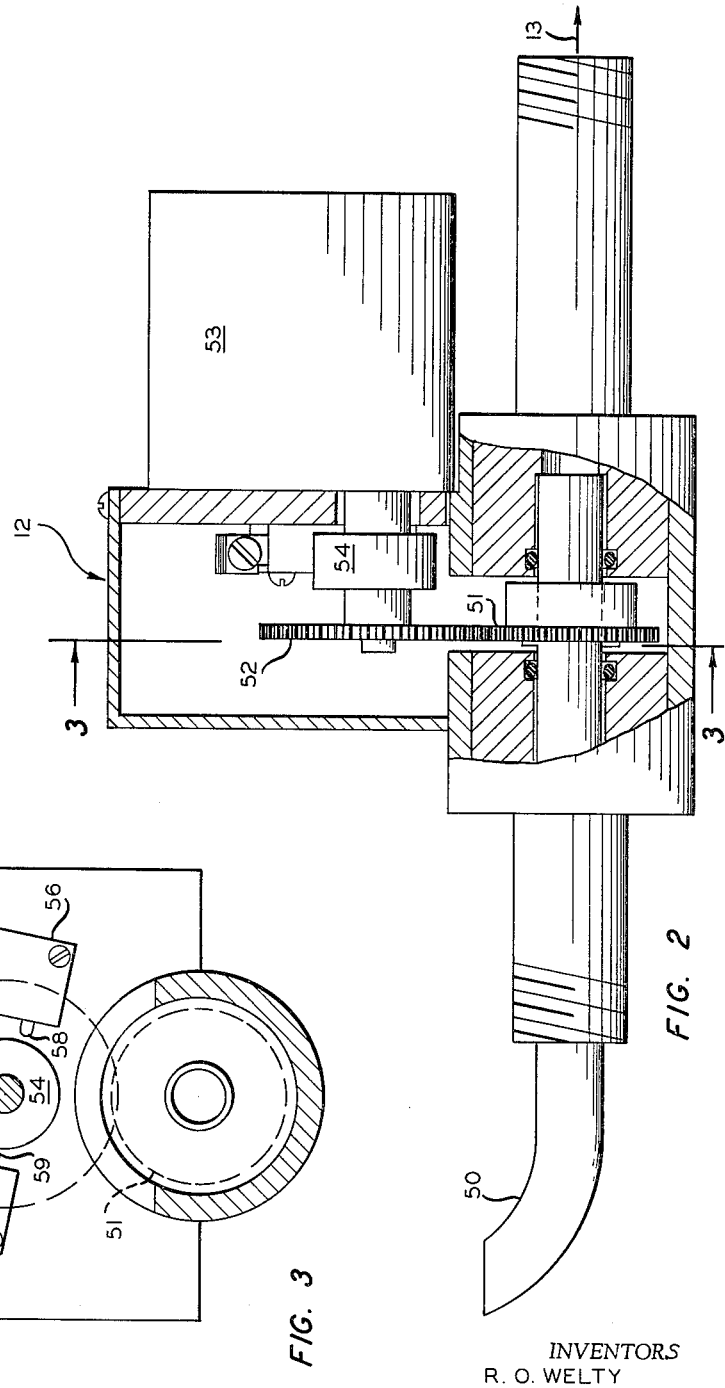

June 30, 1964 R. O. WELTY ETAL 3,138,950
APPARATUS FOR CONCURRENT MEASUREMENT OF POLYMER MELT
VISCOSITIES AT HIGH AND LOW SHEAR RATES
Filed March 20, 1961 5 Sheets-Sheet 3

INVENTORS
R. O. WELTY
E. C. MILLER
BY
Hudson & Young
ATTORNEYS

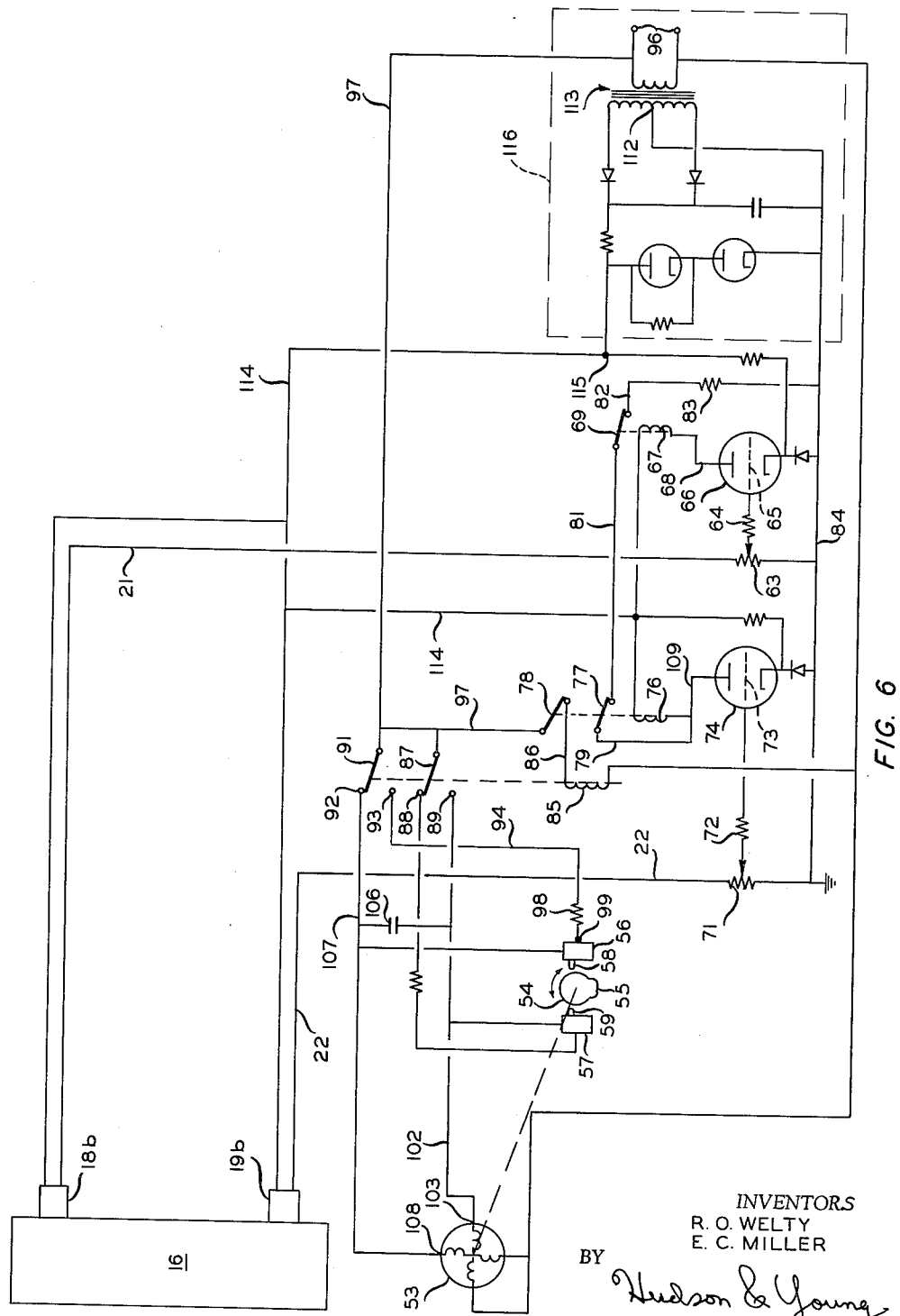

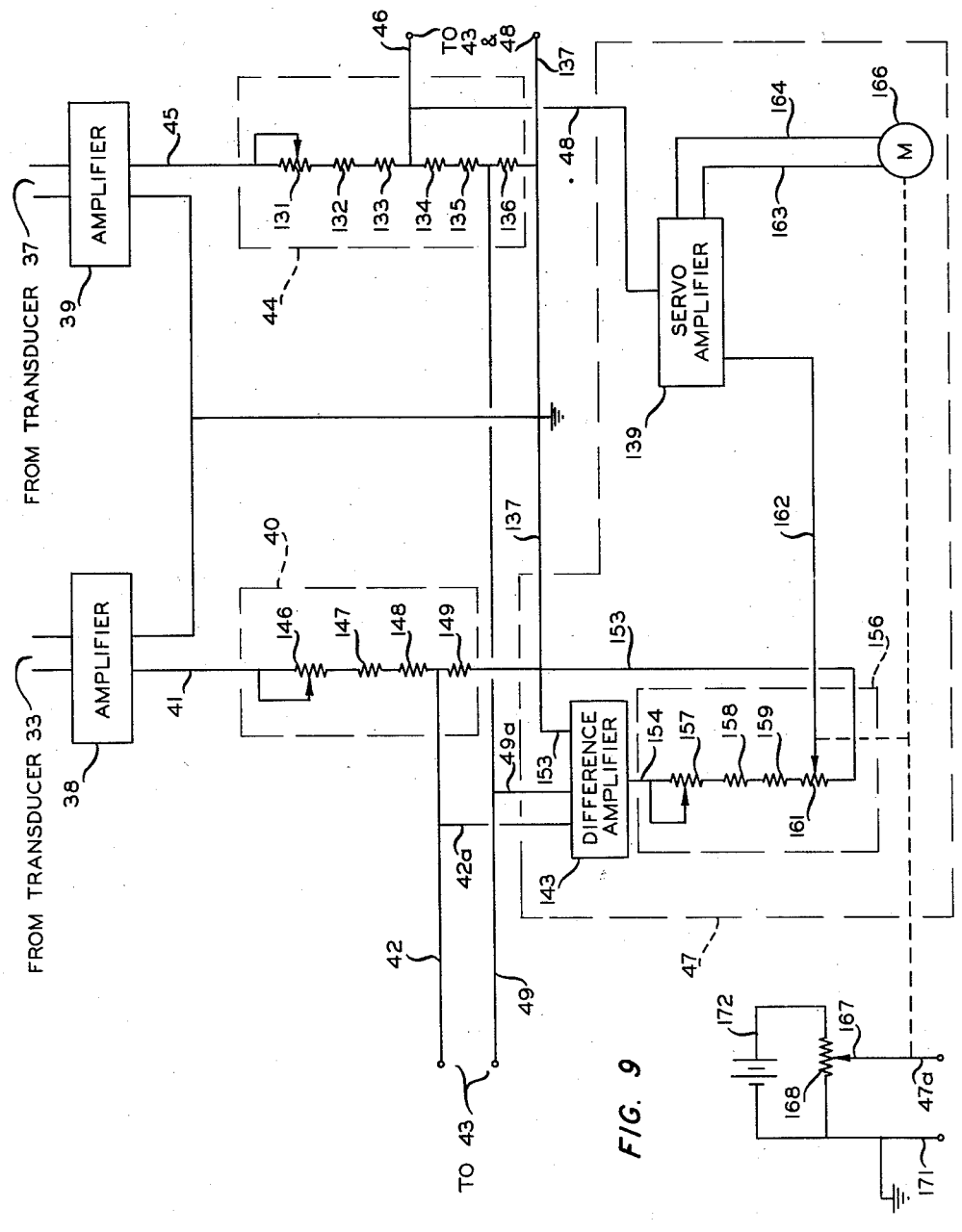

United States Patent Office 3,138,950
Patented June 30, 1964

3,138,950
APPARATUS FOR CONCURRENT MEASUREMENT OF POLYMER MELT VISCOSITIES AT HIGH AND LOW SHEAR RATES
Richard O. Welty and Elmer C. Miller, Bartlesville, Okla., assignors to Phillips Petroleum Company, a corporation of Delaware
Filed Mar. 20, 1961, Ser. No. 97,026
12 Claims. (Cl. 73—55)

This invention relates to apparatus for determining the apparent viscosity of fluid polymeric materials at both high and low shear rates from a single sample. In one aspect it relates to apparatus for continuously measuring a rheological property of a polymer which is a function of shear rate. In another aspect it relates to apparatus for automatically measuring and comparing melt viscosities at high and low shear rates in order to indicate polymer behavior unner processing conditions.

It has become apparent that a knowledge of the rheological properties of a polymer is very important in order to predict its processability. In particular, melt viscosity determination at both high and low shear rates is needed in order to be able to characterize the polymer in terms of both molecular weight and molecular weight distribution. It is known that melt viscosity when measured at low shear rates is mainly proportional to the molecular weight, while melt viscosity measured at high shear rates is related to molecular weight distribution, as well as to the molecular weight. Concurrent measurement and comparison of the apparent viscosity of a polymer melt at two dissimilar shear rates would add a new dimension (molecular weight distribution) to product specification.

One of the properties normally employed for control purposes is "Melt Index," which index partially characterizes the processability of the polymers, and is also an indication of polymer molecular weight. Melt Index is measured according to the ASTM Test D–1238–52T. In this test, the rate of extrusion in grams per 10 minutes (through an orifice 0.0825 inch in diameter and 0.315 inch in length) is determined for polymer at 190° C. under the weight of a piston having a diameter of 0.373 inch and weighing 2160 grams. A deficiency of the ASTM test for "Melt Index" is that the results are obtained at relatively low shear rates, resulting in a poor correlation to the results at high shear rates encountered under polymer fabricating conditions.

Melt viscosity at high shear rates is preferably measured employing the rheometer developed by Canadian Industries, Ltd. (CIL), commonly called a high shear rate viscosimeter. The CIL viscosimeter is a capillary-type machine capable of operating in the temperature range of 257–600° F., and at pressures up to 2500 p.s.i. supplied by a nitrogen cylinder. The capillary used to determine the data in this test has a diameter of 0.01925 inch and a length of 0.176 inch, the rate of extrusion in grams per minute being determined, with the absolute number being related to melt viscosity.

In the case of Newtonian fluids, the flow and pressure may be converted to shear rate and shear stress (at the walls), respectively, by the following formulae:

$$G \text{ (shear rate)} = \frac{4Q}{\pi R^3}$$

where Q is volume flow per second, and R is the radius of the capillary, and $$T \text{ (shear stress)} = \frac{PR}{2L}$$

where P is the pressure difference between the ends of the capillary, and L is the length of the capillary. Shear stress divided by shear rate $$\left(\eta = \frac{\pi R^4 P}{8QL}\right)$$

yields Poiseuille's law where $\eta$ is the viscosity of the fluid. Transposing this equation to solve for P:

$$P = \frac{\eta 8QL}{\pi R^4}$$

On the disclosed apparatus, the volume flow rate of polymer melt is held constant by the metering pump and since the other quantities are all constant for a particular capillary, thus it is readily seen that P is a function of the variable $\eta$. In the case of a non-Newtonian fluid, such as a linear polyethylene melt, the shear stress is not linearly proportional to the shear rate. Hence, Poiseuille's constant, $\eta$, must be considered a variable. Therefore, the viscosity measured is more properly termed apparent viscosity since it is dependent on shear rate. With this theoretical explanation in mind, it becomes apparent why viscosity of non-Newtonian fluids must be determined at widely dissimilar shear rates to more properly characterize the polymer melt.

It thus appears desirable to measure the apparent viscosity of a polymer melt at both high and low shear rates for purposes of control, as well as for predicting product specification.

It is an object of this invention to provide apparatus for measurement of the apparent viscosity of a single sample of melt polymer at both high and low shear rates.

Another object of the invention is to provide an apparatus for continuously measuring a property at both high and low shear rates which is a function of shear stress.

Still another object of the invention is to provide an apparatus that will give polymer melt rheology data that correlates with processability over the broad range of polyolefins.

Yet another object of the invention is to provide a measurement system that will give polymer melt rheology data which can be utilzed for controlling the polymerization of said polymer.

These and other objects, modifications and alterations of this invention will become apparent to those skilled in the art without departing from the scope and spirit of this invention and it should be understood that the latter is not necessarily limited to the aforementioned discussion and accompanying drawing.

The foregoing objects are achieved in one aspect by providing an apparatus having, in series: a pelleted polymer fluid transfer system; an automatic sampling system disposed in said transfer system; a plasticizing extruder which provides a flowing polymer melt; positive displacement means for moving the polymer melt at a constant flow rate; a first capillary means; a first means for sensing the pressure upstream of said first capillary to yield a first electrical signal; a second capillary means in series; a second means for sensing the pressure upstream of said second capillary to yield a second electrical signal; a first and second amplifier means for amplifying said first and second electrical signals, respectively; a scaling network for finding the difference between said first and second signals and resulting in a third signal; an automatic recording device recording the said second and third signals as indicative of the apparent viscosity of said flowing polymer at the low and high shear rates, respectively; and an analog computing means for ratioing said amplified second and third electrical signals and recording the resulting fourth signal on said automatic recording means as indicative of the molecular weight distribution of the flowing polymer.

It should be remembered that the first differential electrical signal, taken at high shear rate, records a fluid pressure substantially indicative of molecular weight, and incidentally indicative of molecular weight distribution. The second electrical signal, taken at low shear rate, is predominantly indicative of molecular weight. The resulting ratioed signal of the two signals is then substantially indicative of molecular weight distribution.

For the purpose of more clearly describing the invention and providing a better understanding thereof, reference is made to the accompanying drawing, in which like parts have been designated with like reference numerals, in which:

FIGURE 2 is an elevational view in partial section of an automatic probe-type sampling apparatus;

FIGURE 3 is a top elevational view in partial section taken along line 3—3 of FIGURE 2;

FIGURE 6 is a schematic view of the circuitry of photoelectric cells and sampling device control;

FIGURE 9 is a schematic view of the circuitry of scaling networks which determine the difference in strength between two electrical signals, and transmits the differential signal and one of the first two signals to first and second pens of a multipen recorder, and also of the circuitry of an analog computer which ratios two electrical signals and transmits the resulting ratioed signal to a third pen of the multipen recorder.

Figure 1:
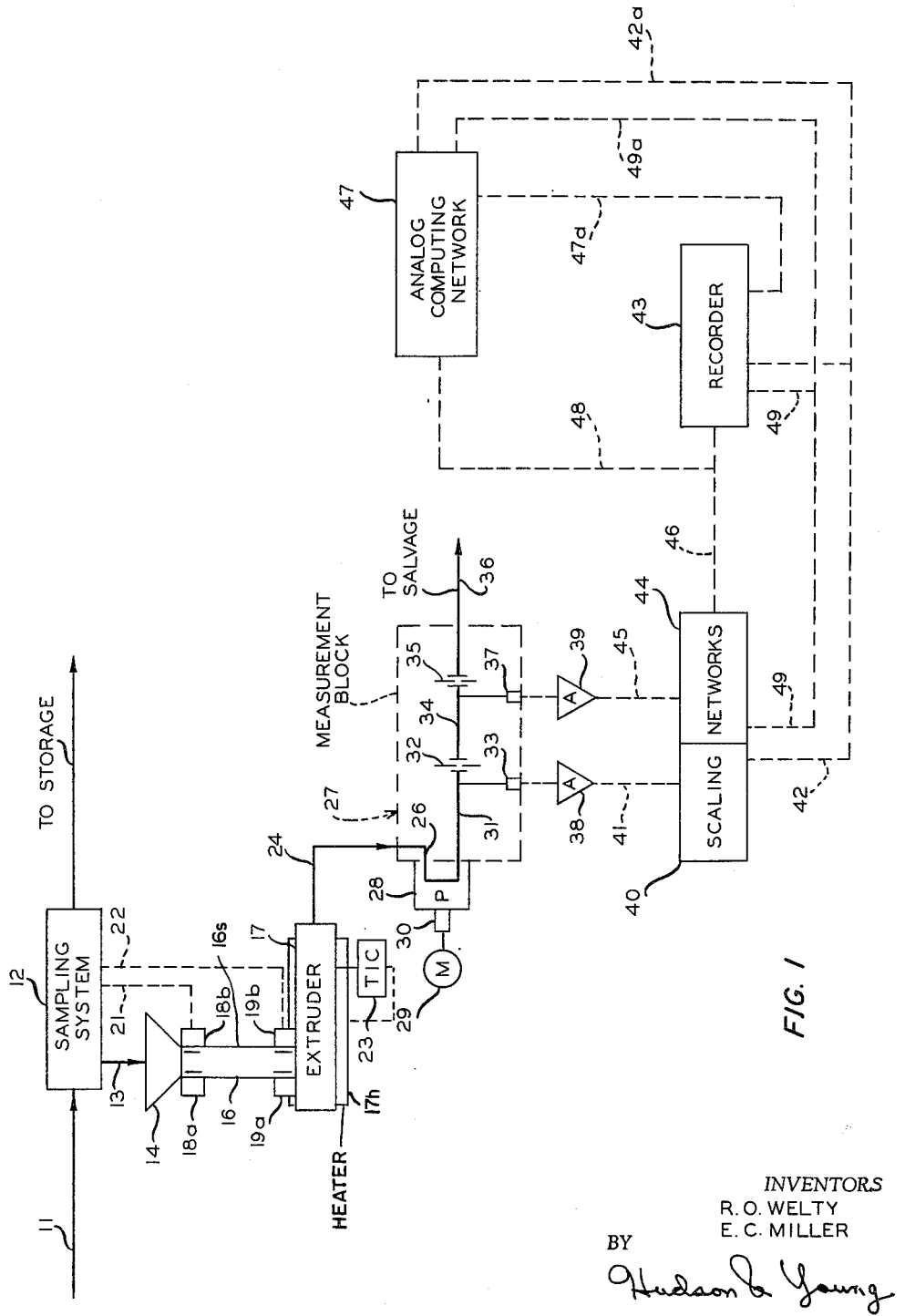
FIGURE 1 is a diagrammatic illustration of apparatus comprising a sampling and extruder feed system, an extruder, a gear pump, a measurement block, transducers, electrical signal amplifiers, a potentiometer an analog computing network, and an automatic recorder suitable for carrying out the invention.

Referring now to the drawing, and to FIGURE 1, in particular, there is shown a particulate material pneumatic transfer line 11. Located in line 11 is an automatic, particulate material sampling device 12, only one being shown for the sake of clarity although a plurality of pneumatic transfer lines may be periodically sampled and concurrently fed to the measurement apparatus. Sampling device 12 is in communication via pneumatic conduit 13 with an inlet port in the top of multi-inlet hopper 14. The upper end of a cylindrical storage chamber 16 connects with the narrow, lower end of hopper 14, and at the lower end thereof with the feed inlet of plasticizing extruder 17.

Disposed at the upper and lower ends of chamber 16 are conventional light sources 18a and 19a, and photoelectric cells 18b and 19b which are in electrical communication, via leads 21 and 22, respectively, with sampling device 12. A suitable photoelectric cell for use in this invention is the Clairex Type CL5.

In this particular embodiment, the pelleted polymer samples from chamber 16 are passed through extruder 17, such as the National Rubber Machinery Company Extruder Model 1-inch, No. 50–17V, emerging as a flowing polymer. Heaters, such as 17h, disposed around extruder 17 are thermostatically controlled by a conventional temperature indicator controller 23 to give a polymer melt within a desired temperature range. The flowing polymer passes from extruder outlet conduit 24, through a passage 26 located in a hexahedral measurement block generally designated 27, and into the suction end of a gear pump 28, driven by motor 29, through a speed reduction unit and coupling 30. A suitable positive displacement gear pump is manufactured by Zenith Pump Company, West Newton 25, Massachusetts, namely Type HP4647, size ½. The driving motor may be a Sterling Right Angle Motor, ¼ H.P., 1750 r.p.m. input. A speed reduction unit of the worm and planetary gear type may be used. A suitable coupling is Boston Coupling No. FCBB 25. Block 27 is also thermostatically controlled.

In this invention, the polymer melt is discharged from the outlet of pump 28 at a constant volume flow per second (Q), and at a pressure ranging as high as 5000 p.s.i. The melt flows through block passage 31 which feeds a first capillary 32, having a length to diameter ratio ($L/D$) in the range of 3 to 30. A pressure sensing element 33, such as a strain gauge having a range of 0–5000 p.s.i., is disposed in passage 31, upstream of capillary 32. The polymer melt passes from capillary 32 with its fluid pressure substantially reduced due to pressure drop, through conduit 34 to a second capillary 35 having a $L/D$ in the range of 3 to 30, passing therefrom to the atmosphere, via line 36.

A second pressure sensing element 37, a strain gauge having a range of 0–250 p.s.i., is disposed in intermediate passage 34, upstream of capillary 35. Strain gauges 33 and 37 transmit their weak electrical signals to amplifiers 38 and 39, respectively. A suitable amplifier for this purpose is the Statham Model CAS Strain Gauge Signal Amplifier. The amplified first signal from amplifier 33 passes directly to a scaling network 40, via electrical lead 41.

The amplified second signal from amplifier 39 passes directly to a second scaling network 44 via lead 45. This second signal passes from network 44 simultaneously to recorder 43 via lead 46 to register on a second pen thereof, as a representative of the apparent viscosity of the polymer melt at a low shear rate, and also passes to analog computing network 47 via lead 48. The first signal from network 40 combined with the second signal from network 44 produce a third signal differential between said first and second signals carried by leads 42 and 49 to recorder 43 to be recorded on a first pen thereof, and having a value that represents the pressure differential across the first capillary 32. The differential third signal is also being transmitted via leads 42a and 49a to analog computer circuit 47, where it is ratioed with the amplified second signal transmitted directly from scaling network 44 via leads 46 and 48. Signal 48, alone, represents the lesser pressure differential across the second capillary 35, as its downstream side thereof is at atmospheric pressure. To give a ratio less than 1, the second signal from lead 48 is ratioed to the differential third signal from leads 42a and 49a within computer 47. The resulting ratioed signal is transmitted from computer 47 via lead 47a, and registered on a third pen of a recorder 43 representative of molecular weight distribution, which, in turn, is characteristic of the polymer behavior under processing conditions.

Figure 4:
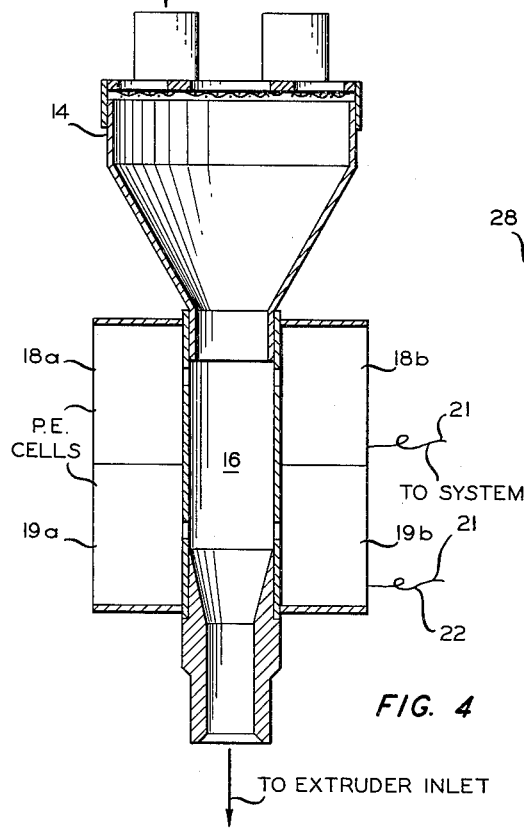
FIGURE 4 is an elevational view in full section of the multi-inlet, hopper-feed system for a plasticizing extruder.

In FIGURES 2 and 3 is shown the sampling apparatus, generally designated 12, communicating via pneumatic tubing 13, with a vented, multi-inlet hopper (shown in FIGURE 4). Sampler 12 comprises a tubular probe 50, preferably of stainless steel, which is curved at the end disposed within pneumatic conveyor line 11 (not shown) to form a plane which is at right angles to the linear line of flow of particulate material within line 11. A spur gear 51 is secured to probe 50 intermediate the ends of probe 50, and is in peripheral interlocking contact with another spur gear 52 secured to the shaft of a motor 53. A cam 54 with a riser 55 is also affixed to the shaft of the motor 53.

In FIGURE 4, conical hopper 14 connects with the lower end of probe 50 via conduit 13. Adjacent the lower end of hopper 14 is cylindrical storage chamber 16. Chamber 16 is provided with two pairs of slits such as 16s, to permit transmission of a light beam from sources 18a and 19a to photoelectric cells 18b and 19b.

Signals from cells 18a and 18b, indicating the establishment or interruption of the light beams, are transmitted via electrical leads 21 and 22 to switches 56 and 57, respectively, shown in FIGURE 3. Biased extensions 58 and 59 on switches 56 and 57, serve as circuit breakers, which operate when the riser 55 on rotating cam 54 strike either extension 58 or 59 to interrupt the transmission of power through that switch and stop motor 53 rotating in either direction, as the case may be.

Figure 5:
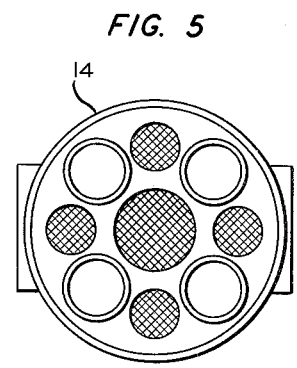
FIGURE 5 is a top elevational view of the hopper system.

FIGURE 5 provides additional perspective on the conical hopper 14.

In FIGURE 6 is shown the circuitry for the automatic sampling system. When the light beam from source 18a across chamber 16 is blocked at upper cell 18b by the rising level of polymer pellets, the hopper chamber 16 is deemed full. At this time, switch 57 is closed, and the driving motor 53 is off. The pellet level begins to fall in chamber 16 as it feeds extruder 17 of FIGURE 1. When the upper light beam again becomes uninterrupted to cell 18b, an increased signal is transmitted therefrom by lead 21, to potentiometer 63, through resistor 64, to raise the voltage on the grid 65 of vacuum tube 66. Tube 66 conducts to energize relay 67 via lead 68, closing switch 69 of relay 67.

Subsequently when the descending pellet level drops below lower photoelectric cell 19b, it allows a light beam to strike cell 19b. An increased signal is then transmitted therefrom through lead 22, to potentiometer 71, through resistor 72, to the grid 73 of vacuum tube 74. Tube 74 conducts to energize relay 76, which closes mechanically-ganged switches 77 and 78. Lead 79 from switch 77 connects to the end of relay 76 which is also common to tube 74. Lead 81 from switch 77 connects to the contactor of switch 69. Lead 82 connects from switch 69, through a resistor 83, to a common ground via lead 84. The simultaneous closing of switch 78 energizes relay 85 via lead 86 which shifts mechanically-ganged switches 87 and 91. In particular, this relay closes contactor 87 with contact 89, and closes contactor 91 with contact 93. Voltage from A.C. power source 96 is applied through lead 97, to switch 91, through contact 93, lead 94, and through resistor 98, to center terminal 99 of switch 56.

The power applied through lead 97 also passes through switch 87, contact 89, through lead 102, to terminal 103 of synchronous motor 53. This power also passes from lead 102, through condenser 106, to lead 107, and to terminal 108 of motor 53. This current starts motor 53 in the direction that causes counterclockwise rotation of the cam 54 on the shaft of motor 53. Cam 54 continues to rotate counterclockwise until riser 55 thereof strikes the biased extension 58 of switch 56, closing the same. When switch 56 closes, condenser 106 is shorted, thereby causing motor 53 to stop rotating. When motor 53 stops, the probe 50 of FIGURE 2 is facing upstream in the pneumatic transfer system, conducting pellets to hopper 14. When the rising pellet level in chamber 16 intercepts the lower light beam to cell 19b, a decreased signal therefrom passes via lead 22, through potentiometer 71, resistor 72, to the grid 73 of vacuum tube 74. Thus, tube 74 stops conducting current via lead 109 to relay 76. However, relay 76 is maintained energized via current through lead 79, closed switch 77, lead 81, closed switch 69, lead 82, through resistor 83, back to common lead 84, which comes from center terminal 112 of the transformer 113. The other end of relay 76 connects via lead 114 to positive terminal 115 of D.C. power source 116.

When the pellet level within chamber 16 rises to the level of upper cell 18b, the light beam is interrupted. The decreased signal from cell 18b passes via lead 21, through potentiometer 63, through resistor 64, to the grid 65 of vacuum tube 66, dropping the voltage and thereby de-energizing relay 67. When relay 67 is thus de-energized, switch 69 opens, shutting off the current which was passing via lead 81, through switch 77, to relay 76, thereby de-energizing relay 76. When relay 76 is de-energized, ganged-switches 77 and 78 shift back to the open position, de-energizing relay 85. The opening of switch 77 will maintain relay 76 de-energized, even when the re-establishment of the upper light beam again closes switch 69. The opening of switch 78, which de-energizes relay 85, permits contactor 87 to close with contact 88, and contactor 91 to close with contact 92. When contactor 91 closes with contact 92, current passes via lead 107, through capacitor 106, to lead 102, and thence to terminal 103 of motor 53. Also, current passes via lead 107 directly to terminal 108 of motor 53. This starts motor 53 rotating in the direction to cause cam 54 on the shaft to rotate clockwise, turning the probe of FIGURE 2 out of the flowing pellet stream, until the riser 55 of cam 54 strikes biased extension 59, closing switch 57, thus shorting out capacitor 106, and again stopping motor 53, with probe 50 in the no-sample position.

Once again, when the pellet level falls, re-establishing the light beam to upper cell 18b, the increased signal passes via lead 21 to grid 65 of tube 66, re-energizing relay 67, and reclosing switch 69. Then, upon the re-establishment of the lower light beam to cell 19b, the motor will be restarted, as described above, turning the probe into the pellet stream and refilling chamber 16.

Figure 7:
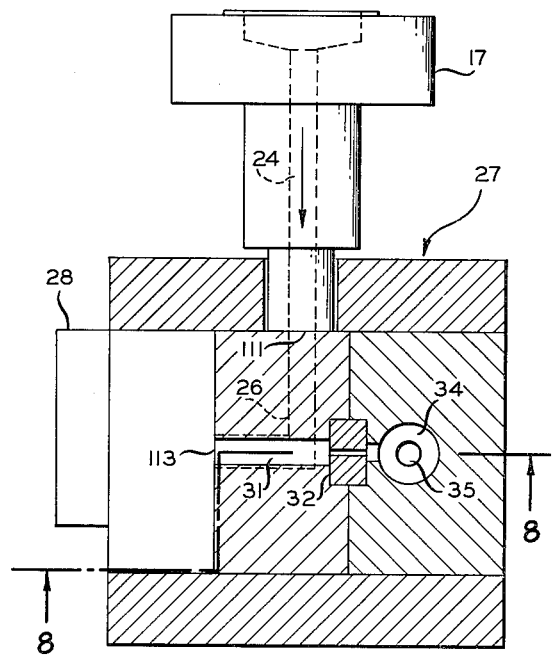
FIGURE 7 is an elevational view in partial section of a hexahedral measurement block for use in determining apparent viscosity at different shear rates.
Figure 8:
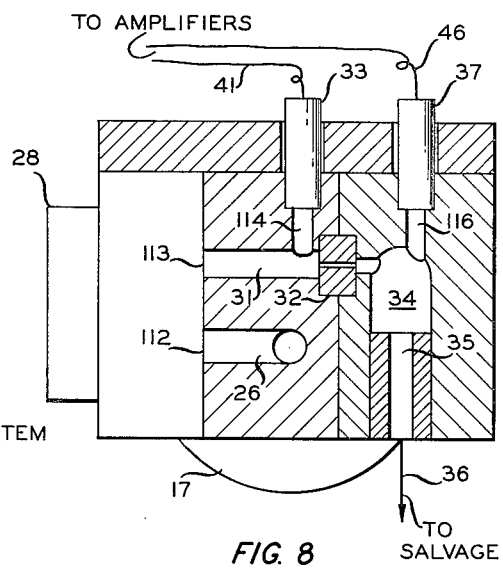
FIGURE 8 is another elevational view in partial section taken along line 8—8 of FIGURE 7.

In FIGURES 7 and 8 are shown views of a steel hexahedral measurement block, generally designated 27, of this invention used for determination of apparent viscosity, and characterization of the processability of a non-Newtonian fluid, such as polymer melt. Polymer melt in conduit 24 from extruder 17 enters block 27 at opening 111, through a passageway 26 therein. Passageway 26 right angles within block 27 and leads to outlet 112, which is adjacent to the suction end of a positive displacement, metering pump, generally designated 28. The discharge from pump 28 re-enters block 27 via opening 113, moving through passage 31, having a receptacle 114 intersecting the same, with a transducer 33 disposed therein, for measuring fluid pressure at this point. A first capillary 32, having a length to diameter ratio in the range 3 to 30 is located downstream of transducer receptacle 114. The fluid passes from capillary 32 via intermediate passage 34, having a second receptacle 116, with a transducer 37 disposed therein. A second capillary 35, having a length to diameter ratio of 3 to 30 is located downstream of transducer receptacle 116. The fluid passes downstream from capillary 35 and is discharged to atmosphere or via conduct 36 to salvage.

In FIGURE 9 is shown the circuitry of the scaling and analog computing networks which takes a difference between the amplified signals from the transducers, and ratios the signals representing the different pressures.

A signal from strain gauge 37 passes to amplifier 39. The amplified signal from amplifier 39 passes by way of lead 45 to a scaling network, generally designated 44. Scaling network 44 comprises, in series, variable resistor 131 having 5,000 ohms, 75,000 ohm resistor 132, 22,500 ohm resistor 133, 900 ohm resistor 134, 50 ohm resistor 135, and 50 ohm resistor 136. Variable resistor 131 is provided for the adjustment of scaling network 44 so that the signal passed to recorder 43 via lead 46 can be adjusted to calibrate to the actual pressure on strain gauge 37. Lead 46 from the junction of resistors 133 and 134 transmits the amplified signal to the second pen of recorder 43. Also, common lead 137 connects with the input terminal of recorder 43. Lead 48, connecting with lead 46, transmits the same signal to the input of a servoamplifier 139 located within analog computing network 47. Input resistor 136 of scaling network 44 provides the means for taking a difference between the scaled-down, output voltages from amplifiers 38 and 39. In this manner, the signal from amplifier 39 is subtracted from the signal from amplifier 38 to give a differential electrical signal, which is representative of the pressure differential across first capillary 32. The scaled-down signal from scaling network 44 passes from the junction of resistors 135 and 136 via electrical lead 49 to the low side connection of a first pen of recorder 43, also via lead 49a to the low input terminal of difference amplifier 143, also located within analog computing network 47.

Lead 41 from amplifier 38 passes to a second scaling network 40. Scaling network 40 comprises, in series, a variable resistor 146 having 1,000 ohms, a resistor 147 having 75,000 ohms, resistor 148 having 22,500 ohms, and resistor 149 of 1,000 ohms. Variable resistor 146 is provided for the adjustment of scaling network 40 so that the signal passed to recorder 43 via lead 42 can be adjusted to calibrated to the actual pressure on strain gauge 33. The voltage signal from the junction of resistors 148 and 149 passes to the terminal of a first pen of recorder 43. Signal in lead 42 also passes via lead 42a to the input terminal of difference amplifier 143. One output from amplifier 143 passes via lead 153 to common ground lead 137. The second output from amplifier 143 passes via lead 153 to a third scaling network 156, also within analog computing network 47. Scaling network 156 comprises, in series, variable resistor 157 having 500 ohms, resistor 158 having 4,000 ohms, resistor 159 having 700 ohms, and potentiometer 161 having 50 ohms. Variable resistor 157 is provided as a means of calibrating scaling network 156 so that the signal passed to a third pen of recorder 43 via lead 47a corresponds to a value representative of the ratios of the pressures applied to strain gauges 33 and 37.

Potentiometer 161 within scaling network 156 serves as the computing potentiometer. Lead 162 connects the center arm of potentiometer 161 with the input of servoamplifier 139. If the voltage of lead 48 and the voltage of lead 162 are different, amplifier 139 provides a signal, via leads 163 and 164, to motor 166, which drives the arm of potentiometer 161 to restore a voltage to lead 162 that balances out voltage in lead 48. Simultaneously, motor 166 is driving arm 167 of potentiometer 168 to supply a signal via leads 47a and 171, to a third pen of recorder 43 which signal is representative of the ratioed signal determined in computing network 47. Telemetering voltage supply 172 is further provided to maintain a constant voltage across potentiometer 168.

The relatively higher shear rate through capillary 32 will be on the order of 500 reciprocal seconds, though it may range considerably higher. In practice, the melt fracture point will determine the highest employable shear rate. The relatively lower shear rate through capillary 35 will be on the order of 2.5 reciprocal seconds, though it may range considerably lower. In practice, the residence time of the melt through the apparatus will determine the lowest employable shear rate. The overall effect of these two variable shear rates is to give a ratio of the high to low shear rates ranging between 20 and 2000.

The signal which is computed by network 47 can be employed in a variety of ways. As indicated, it may be passed to recorder 43 for marking thereon to provide guidance to the operator to manually adjust process variables, such as the feed rate, screw speed, or stock temperature in a process for the pyrolysis of polymers such as described in the application of W. H. Whittington, Serial No. 734,987, filed May 13, 1958, now Patent No. 3,087,922; or in the polymerization of monomers such as described in the patent to Hogan et al., U.S. 2,825,721.

Also, this representative signal may be used for automatic process control. The computed signal may be applied to a process controller, of either a polymerization train or pyrolysis of polymer.

Various other modifications, and alterations of this invention will become apparent to those skilled in the art without departing from the scope and spirit of this invention and it should be understood that the latter is not necessarily limited to the aforementioned discussion.

We claim:

1. An apparatus for indicating the flow characteristics of a non-Newtonian fluid, comprising: first and second capillaries, the opening through said second capillary being larger than the opening through said first capillary; means for forcing said fluid at a constant flow rate through said first and second capillaries, in series; means for controlling the temperature of said fluid; pressure sensing means for measuring first and second pressure drops in said fluid passing through said first and second capillaries, respectively; and means for computing the ratio of said pressure drops, the resulting measurement being taken as indicative of said flow characteristics.

2. An apparatus for characterizing the processability of melt polymers over a broad range of polyolefins comprising, in combination: a pelleted polymer fluid transfer system; an automatic sampling system disposed in said transfer system; a plasticizing extruder which provides a flowing polymer melt; means to transfer the pelleted polymer sample to the feed of said extruder; a first capillary means; a positive displacement means for moving said flowing polymer at a constant volume flow rate to said first capillary means; a first means for sensing the pressure upstream of said first capillary to yield a first signal; a first conduit means communicating with the downstream end of said first capillary means; a second capillary means communicating with the downstream end of said first conduit means; a second means for sensing the pressure upstream of said second capillary to yield a second signal; means for finding the difference between said first and second signals resulting in a third signal; a recording means for recording the said second and third signals as indicative of the apparent viscosity of said flowing polymer at low and high shear rates, respectively; and computing means for ratioing said second and third signals and recording the resulting fourth signal on said recording means as indicative of the molecular weight distribution of the flowing polymer.

3. Apparatus for characterizing the processability of melt polymers over the broad range of polyolefins comprising, in combination: a pelleted polymer fluid transfer system; an automatic sampling system disposed in said transfer system; a plasticizing extruder which provides a flowing polymer; a first capillary means; a positive displacement means for moving said flowing polymer at a constant volume flow rate to said first capillary means; a first means for sensing the pressure upstream of said first capillary and converting the same to a first electrical signal; a first conduit means communicating with the downstream end of said first capillary means; a second capillary means communicating with the downstream end of said first conduit means; a second means for sensing the pressure upstream of said second capillary and converting the same to a second electrical signal; first and second amplification means for amplifying said first and second electrical signals, respectively; means for finding the difference between said first and second signals, resulting in a third signal; a recording means for recording the said second and third signals as indicative of the apparent viscosity of said flowing polymer at low and high shear rates, respectively; and an analog computing means for ratioing said amplified second and third electrical signals and recording the resulting fourth signal on said recording means as indicative of the molecular weight distribution of the flowing polymer.

4. The apparatus of claim 2 wherein said plasticizing extruder is heated by heaters inserted into said apparatus and the quantity of heat supplied thereto is controlled.

5. An apparatus for obtaining fluid pressure measurements on a flowing polymer at two different shear rates, which can be related to the apparent viscosity thereof, comprising: a positive displacement pumping means; a first inlet means for admitting a non-Newtonian fluid to the suction of said pumping means; a first outlet means communicating with the discharge of said pumping means; a first capillary means having a relatively small diameter; a first passage means communicating between said first outlet means and the upstream end of said first capillary means; a first receptacle in said first passage means for receiving therein a first pressure sensing means; a second capillary means, a second passage means between the downstream end of said first capillary means and the upstream end of said second capillary means, said second capillary means having a relatively larger diameter than that of said first capillary means; a second receptacle in said second passage means for receiving therein a second pressure sensing means; and the downstream end of said capillary means being in communication with the atmosphere.

6. The apparatus of claim 5 wherein each of said first and second pressure sensing means is a strain gauge.

7. An automatic particulate material sampling system comprising, in combination: at least one tubular probe with a curved open end disposed in a particulate material fluid transfer system, and the other end of said probe operatively communicating with a vented feed hopper; a light source providing a first light beam through the lower end of a storage chamber located below and communicating with said hopper; a first photoelectric cell disposed about the lower end of said storage chamber; said first cell adapted to receive said first light beam through said chamber when the level of the stored particulate material therein falls below the first optical path to said first photoelectric cell; said probe adapted to rotate the open end to face upstream in said fluid transfer system when said first light beam is established; said light source providing a second light beam through the upper end of said chamber; a second photoelectric cell disposed about the upper end of said storage chamber and adapted to receive a second light beam therethrough until the level of said stored particulate material therein rises above and thus interrupts the second optical path to said second photoelectric cell; and said probe adapted to rotate the open end to face downstream in said fluid transfer system when said second light beam is interrupted.

8. An automatic particulate material sampling system comprising, in combination: at least one tubular probe with a curved open end disposed in a particulate material fluid transfer system, and the other end of said probe operatively communicating with a vented feed hopper; a light source providing a first beam through the lower end of a storage chamber located below and communicating with said hopper; a first photoelectric cell disposed about the lower end of a storage chamber; said first cell adapted to receive said first light beam through said chamber when the level of the stored particulate material therein falls below the first optical path to said first photoelectric cell; said light source providing a second light beam through the upper end of said chamber; a second photoelectric cell disposed about the upper end of said storage chamber and adapted to receive a second light beam therethrough until the level of said stored particulate material therein rises above and thus interrupts the second optical path to said second photoelectric cell; and means responsive to the outputs of said first and second photoelectric cells to control the rotation of said sampling probe alternately so that said open end faces upstream and downstream in said fluid transfer system, as desired.

9. The apparatus of claim 8 wherein said means responsive to said first and second photoelectric cells comprises: a first and second leads to carry a first and second electrical signals between said first and second cells and first and second switches, respectively; said first switch adapted to permit an electric motor to turn in a one direction and rotate said tubular probe by means of a first and second spur gears to a first sampling position in the particulate material transfer system upon receiving a first electrical signal indicating said first light beam has begun to be transmitted; a riser on a cam gear also affixed to said motor shaft to contact alternatively a first and second extensions on said first and second switches, respectively, to stop rotation of said motor when said probe is in the sampling or non-sampling position, as desired; said second spur gear centered and secured about said tubular probe and in peripheral interlocking contact with said first spur gear; said second switch adapted to permit said electric motor to turn in the opposite direction and rotate said tubular probe by means of said gears back to its original non-sampling position upon receiving a second electrical signal indicating that said second light beam has been interrupted, whereby no additional particulate material can enter said tubular probe.

10. The apparatus of claim 2 wherein said automatic sampling system comprises: at least one tubular probe with a curved open end disposed in a particulate material fluid transfer system, and the other end of said probe operatively communicating with a vented feed hopper; a light source providing a first light beam through the lower end of a storage chamber located below and communicating with said hopper; a first photoelectric cell disposed about the lower end of said storage chamber; said first cell adapted to receive said first light beam through said chamber when the level of the stored particulate material therein falls below the first optical path to said first photoelectric cell; said probe adapted to rotate the open end to face upstream in said fluid transfer system when said first light beam is established; said light source providing a second light beam through the upper end of said chamber; a second photoelectric cell disposed about the upper end of said storage chamber and adapted to receive a second light beam therethrough until the level of said stored particulate material therein rises above and thus interrupts the second optical path to said second photoelectric cell; and said probe adapted to rotate the open end to face downstream in said fluid transfer system when said second light beam is interrupted.

11. The apparatus of claim 5 wherein each of said first and second capillary means has a length to diameter ratio in the range of 3 to 30.

12. The apparatus of claim 11 wherein the ratios of the shear rates of said first and second capillaries ranges between 20 and 2000.

References Cited in the file of this patent
UNITED STATES PATENTS

| | | |
|---|---|---|
| 2,035,951 | Eckstein | Mar. 31, 1936 |
| 2,700,891 | Shafer | Feb. 1, 1955 |
| 2,834,200 | Rhodes et al. | May 13, 1958 |
| 2,906,126 | Brown | Sept. 29, 1959 |
| 2,934,944 | Eolkin | May 3, 1960 |
| 3,007,340 | Krafston | Nov. 7, 1961 |